United States Patent
Cong et al.

(10) Patent No.: US 10,924,139 B2
(45) Date of Patent: Feb. 16, 2021

(54) RADIO FREQUENCY CIRCUIT AND ELECTRONIC DEVICE

(71) Applicant: GUANGDONG OPPO MOBILE TELECOMMUNICATIONS CORP., LTD., Guangdong (CN)

(72) Inventors: Ming Cong, Guangdong (CN); Bin Feng, Guangdong (CN)

(73) Assignee: GUANDDONG OPPO MOBILE TELECOMMUNICATIONS CORP., LTD., Guandgong ( * ) Notice: Subject to any disclaimer, the term of this patent is extended or adjusted under 35 U.S.C. 154(b) by 0 days.

(21) Appl. No.: 16/633,072

(22) PCT Filed: Jun. 5, 2018

(86) PCT No.: PCT/CN2018/089954
§ 371 (c)(1),
(2) Date: Jan. 22, 2020

(87) PCT Pub. No.: WO2019/019809
PCT Pub. Date: Jan. 31, 2019

(65) Prior Publication Data
US 2020/0177212 A1 Jun. 4, 2020

(30) Foreign Application Priority Data
Jul. 25, 2017 (CN) .......................... 201710614395.8

(51) Int. Cl.
*H04B 1/00* (2006.01)
(52) U.S. Cl.
CPC ........... *H04B 1/0057* (2013.01); *H04B 1/006* (2013.01)

(58) Field of Classification Search
None
See application file for complete search history.

(56) References Cited

U.S. PATENT DOCUMENTS

| | | | | |
|---|---|---|---|---|
| 1,493,235 A | * | 5/1924 | Besson | ................. F24D 19/061 237/79 |
| 1,633,753 A | * | 6/1927 | Matt | ....................... A01M 1/04 43/113 |

(Continued)

FOREIGN PATENT DOCUMENTS

| | | | | |
|---|---|---|---|---|
| AU | 6909401 A | * | 1/2002 | ........... G01G 19/047 |
| CN | 101252352 A | * | 8/2008 | ............... H03F 1/56 |

(Continued)

OTHER PUBLICATIONS

International Search Report in the international application No. PCT/CN2018/089954, dated Aug. 29, 2018.

(Continued)

*Primary Examiner* — Berhanu Tadese
(74) *Attorney, Agent, or Firm* — Ladas & Parry LLP (57) ABSTRACT

A radio frequency circuit includes: a first, second, and third switch, a first and second phaser circuit, and a combiner. When the first switch is configured to connect the first phase shifter circuit with the combiner and the second switch is configured to connect the second phase shifter circuit with the combiner, a transmission path for the high-frequency RF signal is cut off relative to the medium-frequency RF signal and a transmission path for the medium-frequency RF signal is cut off relative to the high-frequency RF signal, so as to perform CA of the high-frequency and medium-frequency RF signal to obtain a first aggregation signal, and the combiner performs CA on the first aggregation signal and a low-frequency signal.

20 Claims, 8 Drawing Sheets

(56) References Cited

U.S. PATENT DOCUMENTS

| | | | | |
|---|---|---|---|---|
| 2,498,336 | A | * | 2/1950 | Kennedy ................ B65H 23/06 242/422.4 |
| 2,622,681 | A | * | 12/1952 | Durst ................ B65H 35/0066 83/208 |
| 4,467,016 | A | * | 8/1984 | Baldi ..................... B01J 23/892 138/143 |
| 5,065,350 | A | * | 11/1991 | Fedder ................ G01M 3/3263 702/98 |
| 5,350,214 | A | * | 9/1994 | Yamauchi ............ B62D 25/088 296/204 |
| 5,519,558 | A | * | 5/1996 | Ennis .................... H02H 9/026 361/31 |
| 5,798,253 | A | * | 8/1998 | Bartholmes ................ C02F 3/34 435/243 |
| 5,856,316 | A | * | 1/1999 | Laguna Granja ....... A61P 15/08 514/164 |
| 6,909,401 | B2 | * | 6/2005 | Rutfors .................. H01Q 1/243 343/700 MS |
| 7,471,930 | B2 | * | 12/2008 | Okuyama ............ H04B 1/0057 455/78 |
| 8,319,578 | B2 | * | 11/2012 | Rofougaran .............. H01P 5/10 333/25 |
| 8,340,724 | B2 | * | 12/2012 | Beaudin ................ H01Q 21/30 455/561 |
| 8,391,821 | B2 | * | 3/2013 | Okabe ..................... H04B 1/38 455/323 |
| 8,406,159 | B2 | * | 3/2013 | Poulin .................. H04L 5/1469 370/280 |
| 9,172,422 | B2 | * | 10/2015 | Desclos .................... H04B 1/44 |
| 9,185,705 | B2 | | 11/2015 | Rajagopal et al. |
| 9,281,849 | B2 | * | 3/2016 | Black .................. H04B 1/0458 |
| 9,350,059 | B2 | * | 5/2016 | Easter ..................... H04B 1/44 |
| 9,413,416 | B2 | * | 8/2016 | Khlat ...................... H04B 1/52 |
| 9,444,609 | B2 | * | 9/2016 | Rousu ................... H04L 5/0023 |
| 9,559,433 | B2 | * | 1/2017 | Zhou ...................... H01Q 5/35 |
| 9,621,230 | B2 | * | 4/2017 | Ouyang .................. H01Q 5/35 |
| 9,722,639 | B2 | * | 8/2017 | Khlat .................. H04B 1/0064 |
| 9,799,952 | B2 | * | 10/2017 | Bojer .................. H04B 1/0057 |
| 9,866,178 | B2 | * | 1/2018 | Anderson ................ H03F 1/26 |
| 9,876,478 | B2 | * | 1/2018 | Modi ................... H03F 1/0222 |
| 9,960,793 | B2 | | 5/2018 | Anthony et al. |
| 9,985,680 | B2 | * | 5/2018 | Wloczysiak .......... H04W 52/52 |
| 10,096,900 | B2 | * | 10/2018 | Dupuy .................. H01Q 5/378 |
| 10,141,901 | B2 | * | 11/2018 | Zhang .................. H03F 1/0227 |
| 10,469,123 | B2 | * | 11/2019 | Emmanuel ............... H04B 1/48 |
| 10,530,064 | B2 | * | 1/2020 | Desclos .................. H01Q 5/335 |
| 2007/0149143 | A1 | * | 6/2007 | Kim .................... H04B 1/0078 455/76 |
| 2009/0237218 | A1 | * | 9/2009 | Kim .................. G06K 19/0726 340/10.3 |
| 2013/0195224 | A1 | * | 8/2013 | Xu ...................... H04L 27/2071 375/328 |
| 2013/0336242 | A1 | | 12/2013 | Rajagopal et al. |
| 2014/0321576 | A1 | * | 10/2014 | Mirzaei ................ H04B 7/0682 375/297 |
| 2015/0133067 | A1 | | 5/2015 | Chang et al. |
| 2015/0249292 | A1 | * | 9/2015 | Ouyang ................. H01Q 5/371 343/702 |
| 2015/0303973 | A1 | | 10/2015 | Wloczysiak |
| 2015/0304000 | A1 | | 10/2015 | Wloczysiak |
| 2016/0079934 | A1 | * | 3/2016 | Ichitsubo ............ H04B 1/0067 330/251 |
| 2016/0119003 | A1 | | 4/2016 | Granger-Jones et al. |
| 2016/0301379 | A1 | | 10/2016 | Ikada |
| 2016/0380652 | A1 | | 12/2016 | Anthony et al. |
| 2016/0381649 | A1 | | 12/2016 | Anthony et al. |
| 2017/0155421 | A1 | | 6/2017 | Wloczysiak |
| 2017/0222665 | A1 | | 8/2017 | Chang et al. |
| 2017/0230088 | A1 | | 8/2017 | Wloczysiak |
| 2017/0244538 | A1 | | 8/2017 | Chang et al. |
| 2017/0250725 | A1 | * | 8/2017 | Wei ....................... H03F 3/1935 |
| 2019/0097661 | A1 | | 3/2019 | Chang et al. |
| 2019/0229775 | A1 | | 7/2019 | Wloczysiak |
| 2019/0357206 | A1 | * | 11/2019 | Xu ........................ H04L 5/0048 |
| 2020/0106463 | A1 | | 4/2020 | Chang et al. |
| 2020/0137747 | A1 | * | 4/2020 | Xu .................... H04W 72/0413 |
| 2020/0153485 | A1 | * | 5/2020 | Chen ..................... H04L 1/0003 |

FOREIGN PATENT DOCUMENTS

| | | | | |
|---|---|---|---|---|
| CN | 102882539 | A | * 1/2013 | ............... H04B 1/16 |
| CN | 102082326 | B | 3/2014 | |
| CN | 103843257 | A | 6/2014 | |
| CN | 104011998 | A | * 8/2014 | ............. H03F 3/195 |
| CN | 204761429 | U | 11/2015 | |
| CN | 105210291 | A | * 12/2015 | ........... H03H 7/0153 |
| CN | 105471557 | A | 4/2016 | |
| CN | 105850038 | A | 8/2016 | |
| CN | 105850038 | A | * 8/2016 | ............. H03H 7/465 |
| CN | 106788576 | A | 5/2017 | |
| CN | 106797209 | A | 5/2017 | |
| CN | 107332573 | A | 11/2017 | |
| CN | 107332573 | A | * 11/2017 | ............. H04B 1/006 |
| CN | 206657863 | U | * 11/2017 | ............. H01Q 21/28 |
| CN | 107493114 | A | * 12/2017 | ............. H04L 5/001 |
| GB | 1493235 | A | * 11/1977 | ............. G01L 7/084 |
| JP | 5065350 | B2 | * 10/2012 | ........... H04B 1/0057 |
| JP | 5350214 | B2 | * 11/2013 | ............... H04B 1/52 |
| JP | 5519558 | B2 | * 6/2014 | ............... H03F 3/72 |
| JP | 1633753 | S | * 6/2019 | |
| KR | 101150249 | B1 | * 6/2012 | ............. H01Q 23/00 |
| KR | 101252352 | B1 | * 4/2013 | |
| SU | 1493235 | A2 | * 7/1989 | |
| WO | 2016174302 | A1 | 11/2016 | |

OTHER PUBLICATIONS

First Office Action of Chinese application No. 201710614395.8, dated Dec. 27, 2018.

Supplementary European Search Report in the European application No. 18838020.8, dated Apr. 24, 2020.

* cited by examiner

RADIO FREQUENCY CIRCUIT AND ELECTRONIC DEVICE

CROSS-INTERFERENCE TO RELATED APPLICATIONS

This application is a national phase of International Application No. PCT/CN2018/089954, filed on Jun. 5, 2018, and claims priority to China Patent Application No. CN201710614395.8, filed on Jul. 25, 2017 and entitled "Radio Frequency Circuit, Antenna Device and Electronic Device", the contents of which are hereby incorporated by reference in its entirety.

TECHNICAL FIELD

The disclosure relates to the field of mobile communications, and more particularly to a Radio Frequency (RF) circuit and an electronic device.

BACKGROUND

With development of electronic device technologies, a mobile electronic device has gradually evolved from a simple call provision device into a platform for running universal software. The platform provides a running environment including call management application, game entertainment application, office recording application, and mobile payment application and the like, instead of only providing call management as the main purpose. With the massive popularization, the platform has reached every aspect of people's lives and work.

At present, a mobile electronic device may support more and more communication bands. For example, Long Term Evolution (LTE) communication signals may include signals having frequencies between 700 MHz and 2,700 MHz. RF signals that a mobile electronic device may support may be divided into low-frequency signals, medium-frequency signals and high-frequency signals. Each of a low-frequency signal, a medium-frequency signal and a high-frequency signal includes multiple sub-band signals. Each sub-band signal is transmitted to the outside through an antenna.

A Carrier Aggregation (CA) technology may be used to aggregate multiple sub-band signals together so as to increase uplink and downlink network transmission rates.

SUMMARY

Embodiments of the disclosure provide an RF circuit and an electronic device, which may improve the diversity of carrier aggregation (CA) of RF signals by the electronic device.

According to a first aspect, the embodiments of the disclosure provide an RF circuit, which may include a first switch, a second switch, a third switch, a first phase shifter module, a second phase shifter module and a combiner.

An input terminal of the first switch may include a high-frequency port, the high-frequency port may be configured to transmit and receive high-frequency RF signals, and the first phase shifter module may be configured to be connected with the input terminal of the first switch.

An input terminal of the second switch may include a medium-frequency port, the medium-frequency port may be configured to transmit and receive medium-frequency RF signals, and the second phase shifter module may be configured to be connected with the input terminal of the second switch.

An input terminal of the third switch may include a low-frequency port, and the low-frequency port may be configured to transmit and receive low-frequency RF signals.

The first switch, the second switch, the third switch, the first phase shifter module and the second phase shifter module may be encapsulated into a switch chip, and an output terminal of the first switch and an output terminal of the second switch may be connected with each other outside the switch chip.

When the first switch is configured to connect the first phase shifter module with the combiner and the second switch is configured to connect the second phase shifter module with the combiner, the first phase shifter module may be configured to adjust a phase shift amount of a high-frequency RF signal output by the high-frequency port to a first preset value and the second phase shifter module may be configured to adjust a phase shift amount of a medium-frequency RF signal output by the medium-frequency port to a second preset value, to allow a transmission path for the high-frequency RF signal to be cut off relative to the medium-frequency RF signal and allow a transmission path for the medium-frequency RF signal to be cut off relative to the high-frequency RF signal, so as to perform carrier aggregation of the high-frequency RF signal and the medium-frequency RF signal to obtain a first aggregation signal, and the combiner may be configured to perform carrier aggregation of the first aggregation signal and a low-frequency RF signal.

According to a second aspect, the embodiments of the disclosure also provide an RF circuit, which may include an RF transceiver, a first switch, a second switch, a third switch, a first phase shifter module, a second phase shifter module, a combiner and an antenna. The RF transceiver may be configured to be connected with an input terminal of each of the first switch, the second switch and the third switch, and the antenna may be connected with an output terminal of the combiner.

The input terminal of the first switch may include a high-frequency port, the high-frequency port may be configured to transmit and receive high-frequency RF signals, and the first phase shifter module may be configured to be connected with the input terminal of the first switch.

The input terminal of the second switch may include a medium-frequency port, the medium-frequency port may be configured to transmit and receive medium-frequency RF signals, and the second phase shifter module may be configured to be connected with the input terminal of the second switch.

The input terminal of the third switch may include a low-frequency port, and the low-frequency port may be configured to transmit and receive low-frequency RF signals.

The first switch, the second switch, the third switch, the first phase shifter module and the second phase shifter module may be encapsulated into a switch chip, and an output terminal of the first switch and an output terminal of the second switch may be connected with each other outside the switch chip.

When the first switch is configured to connect the first phase shifter module with the combiner and the second switch is configured to connect the second phase shifter module with the combiner, the first phase shifter module may be configured to adjust a phase shift amount of a high-frequency RF signal output by the high-frequency port to a first preset value and the second phase shifter module may be configured to adjust a phase shift amount of a medium-frequency RF signal output by the medium-frequency port to a second preset value, to allow a transmission path for the high-frequency RF signal to be cut off relative to the medium-frequency RF signal and allow a transmission path for the medium-frequency RF signal to be cut off relative to the high-frequency RF signal, so as to perform carrier aggregation of the high-frequency RF signal and the medium-frequency RF signal to obtain a first aggregation signal, and the combiner may perform carrier aggregation of the first aggregation signal and a low-frequency RF signal.

According to a third aspect, the disclosure also provides an electronic device, which may include a housing and a circuit board. The circuit board may be mounted in the housing, an RF circuit may be disposed on the circuit board, and the RF circuit may be the abovementioned RF circuit.

BRIEF DESCRIPTION OF DRAWINGS

In order to describe the technical solutions in the embodiments of the disclosure more clearly, the drawings required to be used in descriptions about the embodiments will be simply introduced below. It is apparent that the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those skilled in the art based on the embodiments in the disclosure without creative work shall fall within the scope of protection of the disclosure.

In the descriptions of the disclosure, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and the like are orientation or position relationships illustrated in the drawings, are adopted not to indicate or imply that indicated devices or components must be in specific orientations or structured and operated in specific orientations but only to conveniently describe the disclosure and simplify descriptions, and therefore are not to be constructed as limiting the disclosure. In addition, terms "first" and "second" are only adopted for description and should not be understood to indicate or imply relative importance or implicitly indicate the number of indicated technical features. Therefore, features defined by "first" and "second" may explicitly or implicitly indicate inclusion of one or more such features. In the descriptions of the disclosure, "multiple" means two or more than two, unless otherwise limited definitely and specifically.

In the descriptions of the disclosure, unless otherwise definitely specified and limited, terms "mount", "mutually connect" and "connect" should be broadly understood. For example, it may be fixed connection, or may be detachable connection or integrated connection. It may be mechanical connection, or may be electrical connection or mutual communication. It may be direct mutual connection, or may be indirect connection through a medium, or may be communication in two components or an interaction relationship of the two components. For those of ordinary skill in the art, specific meanings of these terms in the disclosure can be understood according to a specific condition.

In the disclosure, unless otherwise definitely specified and limited, the state that a first feature is "above" or "below" a second feature may include that the first and second features directly contact, or may include that the first and second features contact through another feature between the first feature and the second feature rather than directly contact. Moreover, the state that the first feature is "above", "over" and "on" the second feature includes that the first feature is over or above the second feature or only represents that a horizontal height of the first feature is larger than that of the second feature. The state that the first feature is "below", "under" and "beneath" the second feature includes that the first feature is under or below the second feature or only represents that the horizontal height of the first feature is less than that of the second feature.

In the following, the disclosure provides many different implementation modes or examples to implement different structures of the disclosure. For simplifying the disclosure, components and arrangements of specific examples will be described below. Of course, they are merely examples and not intended to limit the disclosure. In addition, reference numbers and/or reference letters may be repeated in different examples of the disclosure and such repetitions are made for simplicity and clarity and do not indicate relationships between each discussed implementation mode and/or arrangement. Moreover, examples of various specific processes and materials are provided in the disclosure. However, those of ordinary skill in the art may realize application of other processes and/or use of other materials.

Frequency resources of various communication markets throughout the world are different. Communication operating companies in different regions have different communication spectrum allocations, and thus there are different frequency band combination requirements for carrier aggregation. It can be seen from the above that at present, the frequency bands aggregated in the carrier aggregation are undiversified, lack in variety and cannot meet the requirements.

The embodiments of the disclosure provide an RF circuit and an electronic device, which will be described below in detail respectively.

An embodiment of the disclosure provides an RF circuit, which includes a first switch, a second switch, a third switch, a first phase shifter module, a second phase shifter module and a combiner.

An input terminal of the first switch includes a high-frequency port, the high-frequency port is configured to transmit and receive high-frequency RF signals, and the first phase shifter module is connected with the input terminal of the first switch.

An input terminal of the second switch includes a medium-frequency port, the medium-frequency port is configured to transmit and receive medium-frequency RF signals, and the second phase shifter module is connected with the input terminal of the second switch.

An input terminal of the third switch includes a low-frequency port, and the low-frequency port is configured to transmit and receive low-frequency RF signals.

The first switch, the second switch, the third switch, the first phase shifter module and the second phase shifter module are encapsulated into a switch chip, and an output terminal of the first switch and an output terminal of the second switch are connected with each other outside the switch chip.

When the first switch connects the first phase shifter module with the combiner and the second switch connects the second phase shifter module with the combiner, the first phase shifter module adjusts a phase shift amount of a high-frequency RF signal output by the high-frequency port to a first preset value and the second phase shifter module adjusts a phase shift amount of a medium-frequency RF signal output by the medium-frequency port to a second preset value, to allow a transmission path for the high-frequency RF signal to be cut off relative to the medium-frequency RF signal and allow a transmission path for the medium-frequency RF signal to be cut off relative to the high-frequency RF signal, so as to perform carrier aggregation of the high-frequency RF signal and the medium-frequency RF signal to obtain a first aggregation signal, and the combiner performs carrier aggregation of the first aggregation signal and a low-frequency RF signal.

In an embodiment, when the first switch connects the first phase shifter module with the combiner and the second switch disconnects the second phase shifter module from the combiner, the combiner performs carrier aggregation of the high-frequency RF signal and the low-frequency RF signal.

When the second switch connects the second phase shifter module with the combiner and the first switch disconnects the first phase shifter module from the combiner, the combiner performs carrier aggregation of the medium-frequency RF signal and the low-frequency RF signal.

In an embodiment, the output terminal of the first switch and the output terminal of the second switch, which are connected with each other outside the switch chip, are connected with an input terminal of the combiner, and an output terminal of the third switch is connected with an input terminal of the combiner.

In an embodiment, the combiner is a dual-frequency combiner.

In an embodiment, each of the first switch, the second switch and the third switch is a single-pole multi-throw switch.

The disclosure also provides an RF circuit, which includes an RF transceiver, a first switch, a second switch, a third switch, a first phase shifter module, a second phase shifter module, a combiner and an antenna. The RF transceiver is connected with an input terminal of each of the first switch, the second switch and the third switch, and the antenna is connected with an output terminal of the combiner.

The input terminal of the first switch includes a high-frequency port, the high-frequency port is configured to transmit and receive high-frequency RF signals, and the first phase shifter module is connected with the input terminal of the first switch.

The input terminal of the second switch includes a medium-frequency port, the medium-frequency port is configured to transmit and receive medium-frequency RF signals, and the second phase shifter module is connected with the input terminal of the second switch.

The input terminal of the third switch includes a low-frequency port, and the low-frequency port is configured to transmit and receive low-frequency RF signals.

The first switch, the second switch, the third switch, the first phase shifter module and the second phase shifter module are encapsulated into a switch chip, and an output terminal of the first switch and an output terminal of the second switch are connected with each other outside the switch chip.

When the first switch connects the first phase shifter module with the combiner and the second switch connects the second phase shifter module with the combiner, the first phase shifter module adjusts a phase shift amount of a high-frequency RF signal output by the high-frequency port to a first preset value and the second phase shifter module adjusts a phase shift amount of a medium-frequency RF signal output by the medium-frequency port to a second preset value, to allow a transmission path for the high-frequency RF signal to be cut off relative to the medium-frequency RF signal and allow a transmission path for the medium-frequency RF signal to be cut off relative to the high-frequency RF signal, so as to perform carrier aggregation of the high-frequency RF signal and the medium-frequency RF signal to obtain a first aggregation signal, and the combiner performs carrier aggregation of the first aggregation signal and a low-frequency RF signal.

In an embodiment, the RF transceiver includes a high-frequency port, a medium-frequency port and a low-frequency port, the high-frequency port is connected with the input terminal of the first switch, the medium-frequency port is connected with the input terminal of the second switch, and the low-frequency port is connected with the input terminal of the third switch.

In an embodiment, the high-frequency port includes $N_1$ transmitting sub-ports with different frequency bands and $N_1$ receiving sub-ports with different frequency bands, the input terminal of the first switch includes $N_1$ input sub-ports, each of the $N_1$ transmitting sub-ports is connected with a respective one of the $N_1$ input sub-ports, and each of the $N_1$ receiving sub-ports is connected with a respective one of the $N_1$ input sub-ports.

The medium-frequency port includes $N_2$ transmitting sub-ports with different bands and $N_2$ receiving sub-ports with different frequency bands, the input terminal of the second switch includes $N_2$ input sub-ports, each of the $N_2$ transmitting sub-ports is connected with a respective one of the $N_2$ input sub-ports, and each of the $N_2$ receiving sub-ports is connected with a respective one of the $N_2$ input sub-ports.

The low-frequency port includes transmitting sub-ports with different frequency bands and $N_3$ receiving sub-ports with different frequency bands, the input terminal of the third switch includes $N_3$ input sub-ports, each of the $N_3$ transmitting sub-ports is connected with a respective one of the $N_3$ input sub-ports, and each of the $N_3$ receiving sub-ports is connected with a respective one of the $N_3$ input sub-ports.

Here, the $N_1$, $N_2$ and $N_3$ are each a natural number greater than 1.

In an embodiment, a duplexer or a filter is connected between each of the sub-ports and a respective one of the input sub-ports.

In an embodiment, a power amplifier is connected between each of the sub-ports and a respective one of the input sub-ports.

In an embodiment, an output terminal of the combiner is connected with the antenna.

Figure 1:
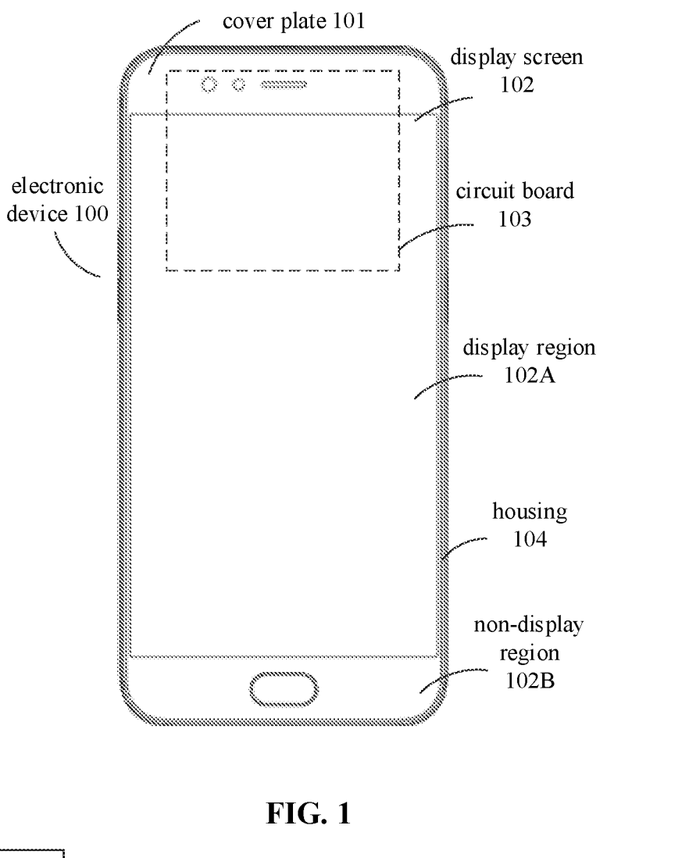
FIG. 1 is a structure diagram of an electronic device according to an embodiment of the disclosure.

An embodiment of the disclosure provides an electronic device. The electronic device may be a device such as a smart phone and a tablet device. Referring to FIG. 1, the electronic device 100 includes a cover plate 101, a display screen 102, a circuit board 103 and a housing 104.

The cover plate 101 is mounted on the display screen 102 to cover the display screen 102. The cover plate 101 may be a transparent glass cover plate. In some embodiments, the cover plate 101 may be a glass cover plate made of a material such as a sapphire.

The display screen 102 is mounted on the housing 104 to form a display surface of the electronic device 100. The display screen 102 may include a display region 102A and a non-display region 102B. The display region 102A is configured to display information such as an image and a text. The non-display region 102B does not display any information. A function component such as a fingerprint module and a touch circuit may be disposed at a bottom of the non-display region 102B.

The circuit board 103 is mounted in the housing 104. The circuit board 103 may be a main board of the electronic device 100. A function component, such as a camera, a proximity sensor and a processor, may be integrated on the circuit board 103. In addition, the display screen 102 may be electrically connected to the circuit board 103.

In some embodiments, an RF circuit is disposed on the circuit board 103. The RF circuit may communicate with a network device (for example, a server and a base station) or another electronic device (for example, a smart phone) through a wireless network to complete information transmission and reception with the network device or the other electronic device.

Figure 2:
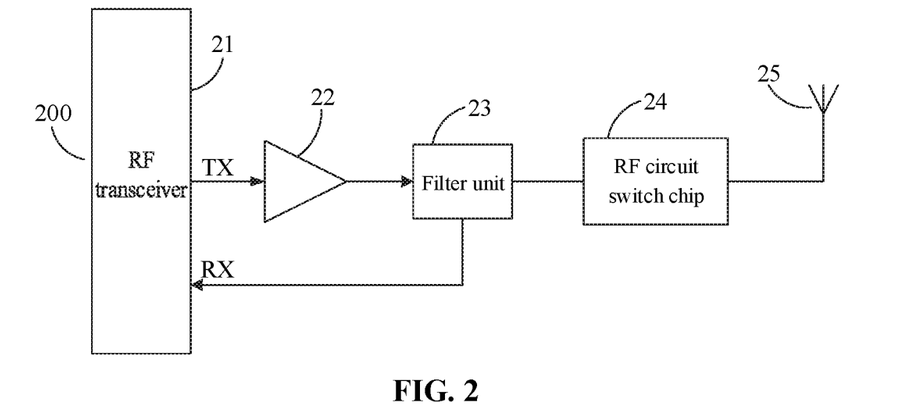
FIG. 2 is a first structure diagram of an RF circuit according to an embodiment of the disclosure.

In some embodiments, as illustrated in FIG. 2, an overall circuit 200 includes an RF transceiver 21, a power amplification unit 22, a filter unit 23, an RF circuit 24 and an antenna 25. The power amplification unit 22, the filter unit 23, the RF circuit 24 and the antenna 25 are sequentially connected.

The RF transceiver 21 has a transmitting port TX and a receiving port RX. The transmitting port TX is configured to transmit an RF signal (an uplink signal), and the receiving port RX is configured to receive an RF signal (a downlink signal). The transmitting port TX of the RF transceiver 21 is connected with the power amplification unit 22, and the receiving port RX of the RF transceiver 21 is connected with the filter unit 23.

The power amplification unit 22 is configured to amplify the uplink signal transmitted by the RF transceiver 21 and send the uplink signal amplified to the filter unit 23.

The filter unit 23 is configured to filter the uplink signal transmitted by the RF transceiver 21 and send the uplink signal filtered to the antenna 25. The filter unit 23 is further configured to filter the downlink signal received from the antenna 25 and send the downlink signal filtered to the RF transceiver 21.

The RF circuit 24 is configured to enable a communication band between the RF transceiver 21 and the antenna 25. A detailed structure and functions of the RF circuit 24 will be described below.

The antenna 25 is configured to transmit the uplink signal sent by the RF transceiver 21 to the outside, or to receive an RF signal from the outside and send a received downlink signal to the RF transceiver 21.

In some embodiments, the overall circuit 200 may further include a control circuit. The control circuit is connected with the RF circuit 24. The control circuit may further be connected with a processor in the electronic device 100 to control a state of the RF circuit 24 according to an instruction from the processor.

Figure 3:
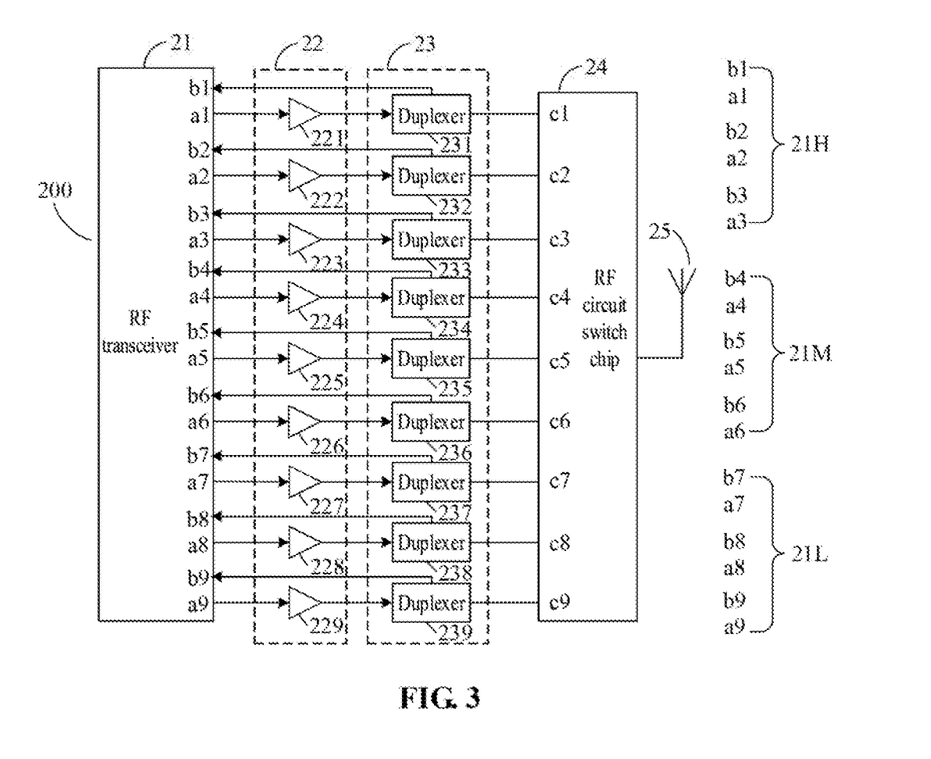
FIG. 3 is a second structure diagram of an RF circuit according to an embodiment of the disclosure.

In some embodiments, as illustrated in FIG. 3, the RF transceiver 21 includes a high-frequency port 21H, a medium-frequency port 21M and a low-frequency port 21L. Each of the high-frequency port 21H, the medium-frequency port 21M and the low-frequency port 21L may include multiple RF transmitting ports and multiple RF receiving ports. The high-frequency port 21H is configured to transmit and receive high-frequency RF signals, the medium-frequency port 21M is configured to transmit and receive medium-frequency RF signals, and the low-frequency port 21L is configured to transmit and receive low-frequency RF signals.

The high-frequency RF signals, the medium-frequency RF signals and the low-frequency RF signals are only relative concepts and are not absolutely distinguished by frequency ranges.

For example, the RF transceiver 21 includes nine RF transmitting ports, e.g., a1, a2, a3, a4, a5, a6, a7, a8 and a9 and nine RF receiving ports, e.g., b1, b2, b3, b4, b5, b6, b7, b8 and b9.

Here, a1, a2 and a3 are high-frequency transmitting ports configured to transmit high-frequency RF signals (for example, RF signals in bands such as band7, band40 and band41), and b1, b2 and b3 are high-frequency receiving ports configured to receive high-frequency RF signals. Here, a4, a5 and a6 are medium-frequency transmitting ports configured to transmit medium-frequency RF signals (for example, RF signals in bands such as band1, band2 and band3), and b4, b5 and b6 are medium-frequency receiving ports configured to receive medium-frequency RF signals. Here, a7, a8 and a9 are low-frequency transmitting ports configured to transmit low-frequency RF signals (for example, RF signals in bands such as band8, band12 and band20), and b7, b8 and b9 are low-frequency receiving ports configured to receive low-frequency RF signals.

The abovementioned embodiments are only described with an example in which the high-frequency port 21H, medium-frequency port 21M and low-frequency port 21L of the RF transceiver 21 each includes three RF transmitting ports and three RF receiving ports. In some other embodiments, each of the high-frequency port 21H, the medium-frequency port 21M and the low-frequency port 21L may include other numbers of RF transmitting ports and RF receiving ports, and the number of the RF transmitting ports in each of the high-frequency port 21H, the medium-frequency port 21M and the low-frequency port 21L is the same and greater than 1 and the number of the RF receiving ports in each of the high-frequency port 21H, the medium-frequency port 21M and the low-frequency port 21L is the same and greater than 1.

The power amplification unit 22 includes nine amplifiers 221, 222, 223, 224, 225, 226, 227, 228 and 229. Each of the amplifiers 221, 222, 223, 224, 225, 226, 227, 228 and 229 is connected with a respective one of the RF transmitting ports a1, a2, a3, a4, a5, a6, a7, a8 and a9 of the RF transceiver 21.

The filter unit 23 includes nine duplexers 231, 232, 233, 234, 235, 236, 237, 238 and 239. Each of the duplexers 231, 232, 233, 234, 235, 236, 237, 238 and 239 is connected with a respective one of the amplifiers 221, 222, 223, 224, 225, 226, 227, 228 and 229. Moreover, each of the duplexers 231, 232, 233, 234, 235, 236, 237, 238 and 239 is connected with a respective one of the RF receiving ports b1, b2, b3, b4, b5, b6, b7, b8 and b9 of the RF transceiver 21.

An input terminal of the RF circuit 24 includes nine input sub-ports c1, c2, c3, c4, c5, c6, c7, c8 and c9. Each of the input sub-ports c1, c2, c3, c4, c5, c6, c7, c8 and c9 is connected with a respective one of the duplexers 231, 232, 233, 234, 235, 236, 237, 238 and 239.

Figure 4:
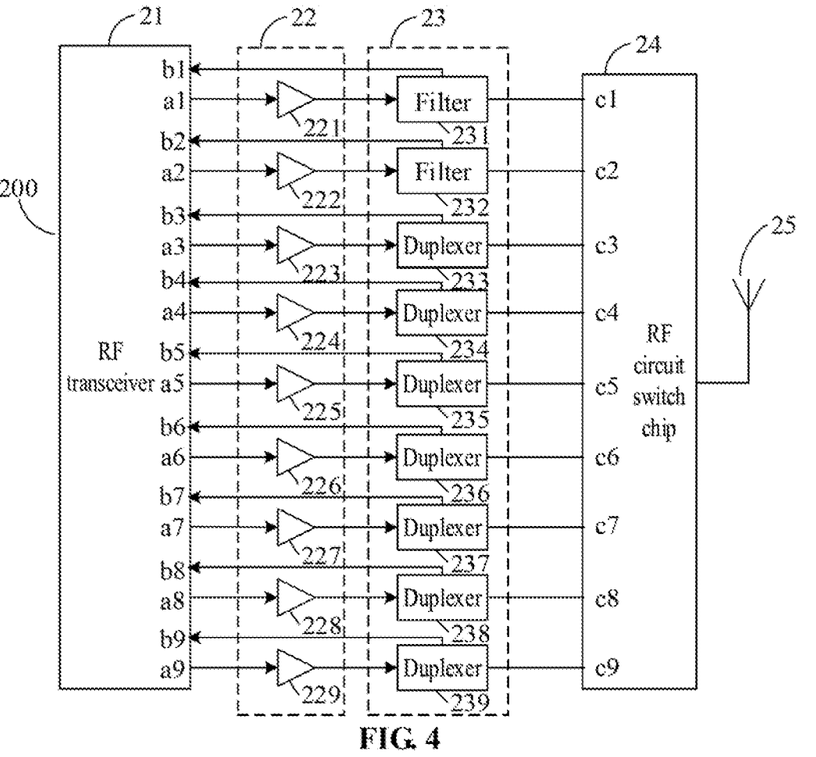
FIG. 4 is a third structure diagram of an RF circuit according to an embodiment of the disclosure.

In some embodiments, as illustrated FIG. 4, the filter unit 23 includes a filter 231, a filter 232 and seven duplexers 233, 234, 235, 236, 237, 238 and 239. Each of the filter 231, the filter 232 and the seven duplexers 233, 234, 235, 236, 237, 238 and 239 is connected with a respective one of the amplifiers 221, 222, 223, 224, 225, 226, 227, 228 and 229. Moreover, each of the filter 231, the filter 232 and the seven duplexers 233, 234, 235, 236, 237, 238 and 239 is connected with a respective one of the RF receiving ports b1, b2, b3, b4, b5, b6, b7, b8 and b9 of the RF transceiver 21.

The input terminal of the RF circuit 24 includes the nine input sub-ports c1, c2, c3, c4, c5, c6, c7, c8 and c9. Each of the input sub-ports c1, c2, c3, c4, c5, c6, c7, c8 and c9 is connected with a respective one of the filter 231, the filter 232 and the seven duplexers 233, 234, 235, 236, 237, 238 and 239.

The abovementioned embodiments are only described with an example in which the filter unit 23 includes two filters and seven duplexers. In some other embodiments, the filter unit 23 may also include other numbers of filters and duplexers.

Figure 5:
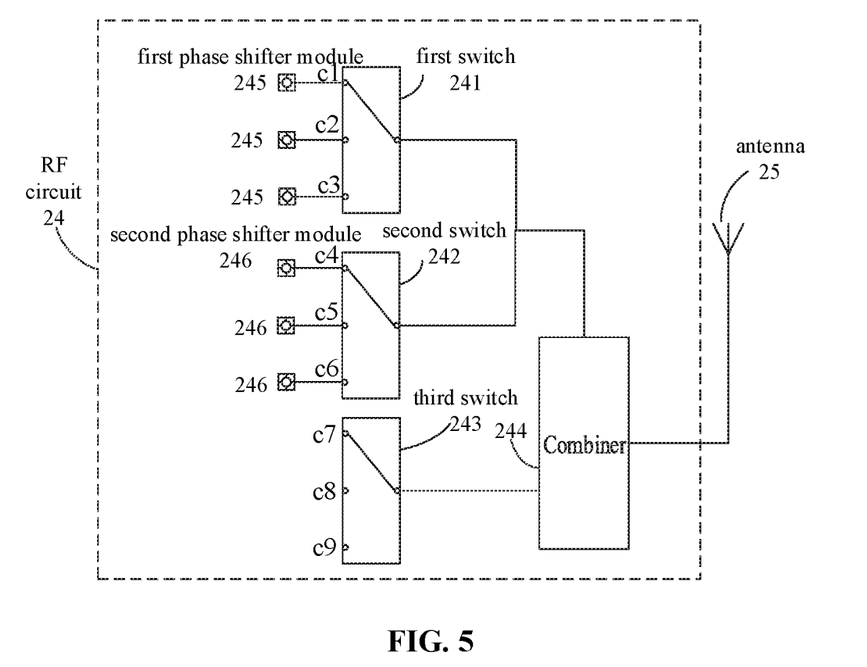
FIG. 5 is a first structure diagram of an RF circuit switch chip according to an embodiment of the disclosure.

Referring to FIG. 5, in some embodiments, the RF circuit 24 includes a first switch 241, a second switch 242, a third switch 243, a first phase shifter module 245, a second phase shifter module 246 and a combiner 244.

Each of the first switch 241, the second switch 242 and the third switch 243 is a single-pole multi-throw switch. For example, the first switch 241 includes three input sub-ports c1, c2 and c3, the second switch 242 includes three input sub-ports c4, c5 and c6, and the third switch 243 includes three input sub-ports c7, c8 and c9. The first switch 241 and the second switch 242 are connected and then connected to an input terminal of the combiner 244, and an output terminal of the third switch 243 is connected to an input terminal of the combiner 244.

The combiner 244 may be a dual-frequency combiner. An output terminal of the combiner 244 is connected to the antenna 25.

The abovementioned connection relationship only represents direct connection between the components and does not represent an electrically on state between the mutually connected components.

In some embodiments, each of the input sub-ports c1, c2 and c3 may be connected with the high-frequency port in the RF transceiver 21, each of the input sub-ports c4, c5 and c6 may be connected with the medium-frequency port in the RF transceiver 21, and each of the input sub-ports c7, c8 and c9 may be connected with the low-frequency port in the RF transceiver 21. The first phase shifter module 245 is connected with an input terminal of the first switch 241, and the second phase shifter module 246 is connected with an input terminal of the second switch 242.

When the switch 241 turns on any path of c1, c2 and c3 and the switch 242 turns on any path of c4, c5 and c6, namely the first switch 241 connects the first phase shifter module 245 with the combiner 244 and the second switch 242 connects the second phase shiner module 246 with the combiner 244, the first phase shifter module 245 adjusts a phase shift amount of a high-frequency RF signal output by the high-frequency port to a first preset value and the second phase shifter module 246 adjusts a phase shift amount of a medium-frequency RF signal output by the medium-frequency port to a second preset value, to allow a transmission path for the high-frequency RF signal to be cut off relative to the medium-frequency RF signal and allow a transmission path for the medium frequency RF signal to be cut off relative to the high-frequency RF signal, so as to perform carrier aggregation of the high-frequency RF signal and the medium-frequency RF signal to obtain a first aggregation signal, and the combiner performs carrier aggregation of the first aggregation signal and a low-frequency RF signal.

When the first switch 241 connects the first phase shifter module 245 with the combiner 244 and the second switch 242 disconnects the second phase shifter module 246 from the combiner 244, the combiner 244 performs carrier aggregation of the high-frequency RF signal and the low-frequency RF signal.

When the first switch 241 disconnects the first phase shifter module 245 from the combiner 244 and the second switch 242 connects the second phase shifter module 246 with the combiner 244, the combiner 244 performs carrier aggregation of the medium-frequency RF signal and the low-frequency RF signal.

For example, the input sub-port c1 may be connected with a transmitting port with the high-frequency band 40 in the RF transceiver 21, the input sub-port c4 may be connected with a transmitting port with the medium-frequency band3 in the RF transceiver 21, and the input sub-port c7 may be connected with a transmitting port with the low-frequency band12 in the RF transceiver 21.

When the switch 241 turns on c1 and the switch 242 turns on c4, carrier aggregation of band40 and band3 may be performed to obtain a first aggregation signal, and the combiner 244 may perform carrier aggregation of the first aggregation signal and the band12.

In the embodiment of the disclosure, the antenna 25 is connected with the output terminal of the combiner 244.

In an embodiment, the antenna includes a first antenna and a second antenna, the output terminal of the first switch and the output terminal of the second switch, which are connected with each other, are connected with the first antenna, and the output terminal of the third switch is connected with the second antenna.

In an embodiment, the antenna includes a first antenna, a second antenna and a third antenna, the output terminal of the first switch is connected with the first antenna, the output terminal of the second switch is connected with the second antenna, and the output terminal of the third switch is connected with the third antenna.

Figure 6:
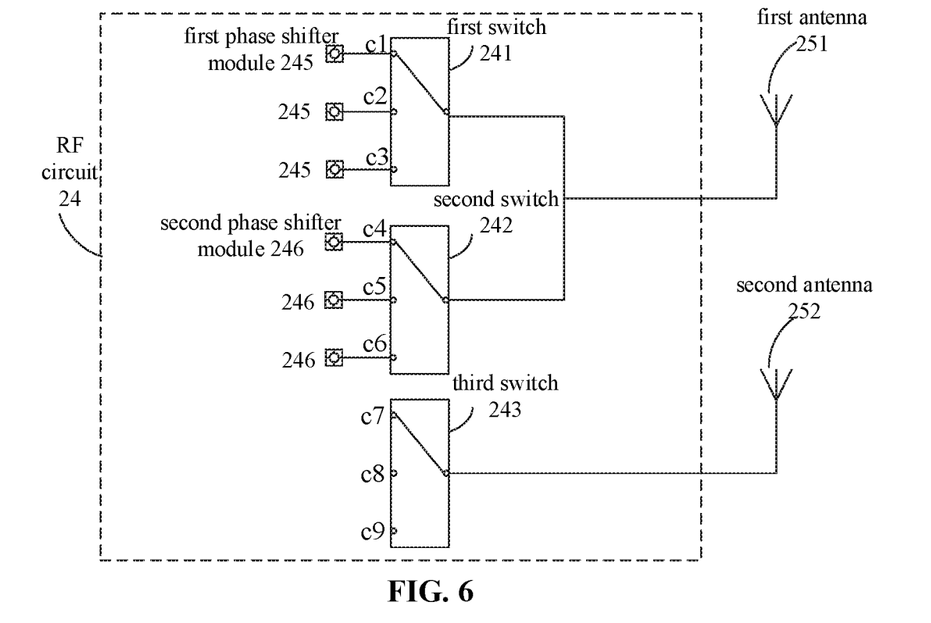
FIG. 6 is a second structure diagram of an RF circuit switch chip according to an embodiment of the disclosure.

Referring to FIG. 6, in the embodiment, the RF circuit 24 includes the first switch 241, the second switch 242, the third switch 243, the first phase shifter module 245 and the second phase shifter module 236.

Each of the first switch 241, the second switch 242 and the third switch 243 is a single-pole multi-throw switch. For example, the first switch 241 includes three input sub-ports c1, c2 and c3, the second switch 242 includes three input sub-ports c4, c5 and c6, and the third switch 243 includes three input sub-ports c7, c8 and c9. The first switch 241 and the second switch 242, which are connected, are connected to an input terminal of the combiner 244, and an output terminal of the third switch 243 is connected to an input terminal of the combiner 244.

In the embodiment, when the switch 241 turns on any path of c1, c2 and c3 and the switch 242 turns on any path of c4, c5 and c6, carrier aggregation of the high-frequency RF signal and the medium-frequency RF signal is performed to obtain a first aggregation signal.

The output terminal of the first switch 241 and the output terminal of the second switch 242, which are connected with each other, may be connected with a first antenna 251, and the output terminal of the third switch 243 may be connected with a second antenna 252.

Figure 7:
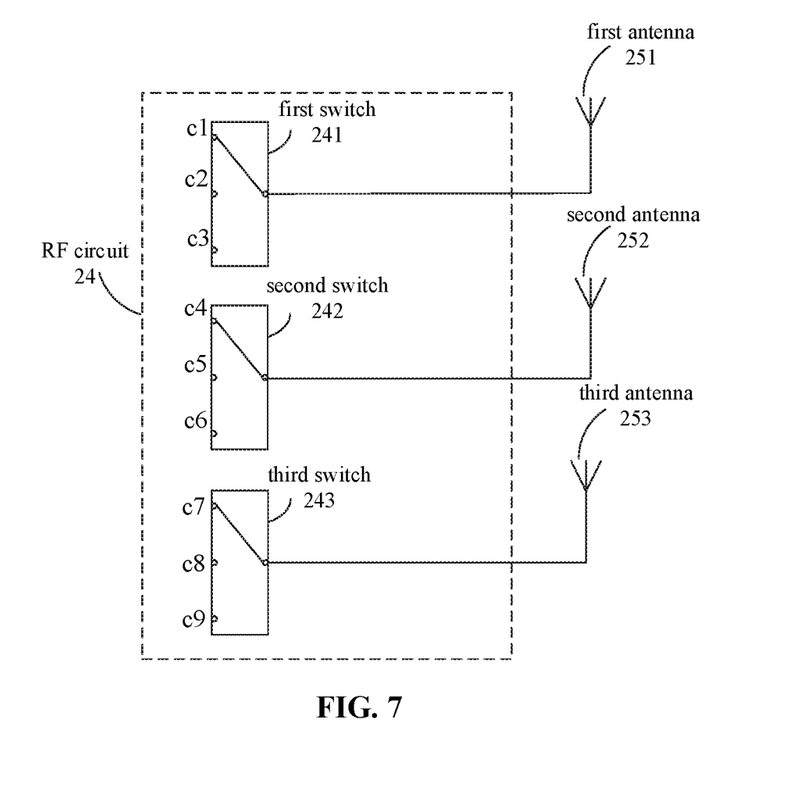
FIG. 7 is a third structure diagram of an RF circuit switch chip according to an embodiment of the disclosure.

Referring to FIG. 7, in the embodiment, a three-antenna design may also be adopted. The RF circuit 24 includes the first switch 241, the second switch 242 and the third switch 243. The first switch 241 is connected a first antenna 251, the second switch 242 is connected with a second antenna 252, and the output terminal of the third switch 243 is connected with a third antenna 253.

Figure 8:
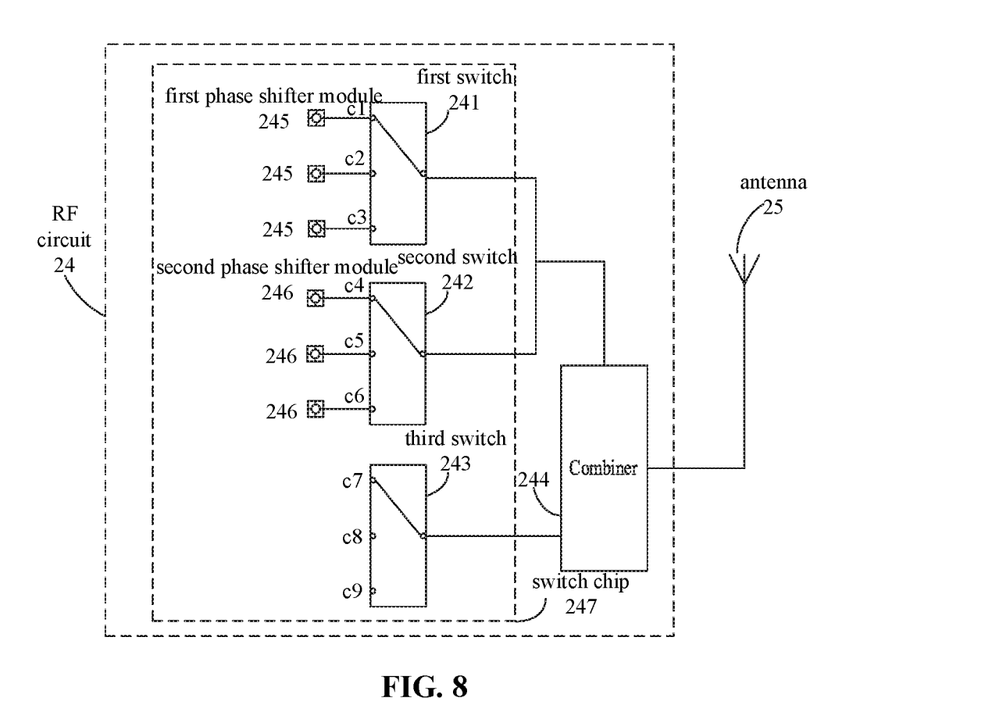
FIG. 8 is a fourth structure diagram of a switch chip of an RF circuit, according to an embodiment of the disclosure.

As illustrated in FIG. 8, in some embodiments, the first switch 241, the second switch 242, the third switch 243, the first phase shifter module 245 and the second phase shifter module 246 may be encapsulated into a switch chip 247.

The output terminal of the first switch 241 and the output terminal of the second switch 242 are connected with each other outside the switch chip 247.

The combiner 244 may be a dual-frequency combiner, and the output terminal of the combiner 244 is connected to the antenna 25.

In some embodiments, each of the input sub-ports c1, c2 and c3 may be connected with the high-frequency port in the RF transceiver 21, each of the input sub-ports c4, c5 and c6 may be connected with the medium-frequency port in the RF transceiver 21, and each of the input sub-ports c7, c8 and c9 may be connected with the low-frequency port in the RF transceiver 21.

Figure 9:
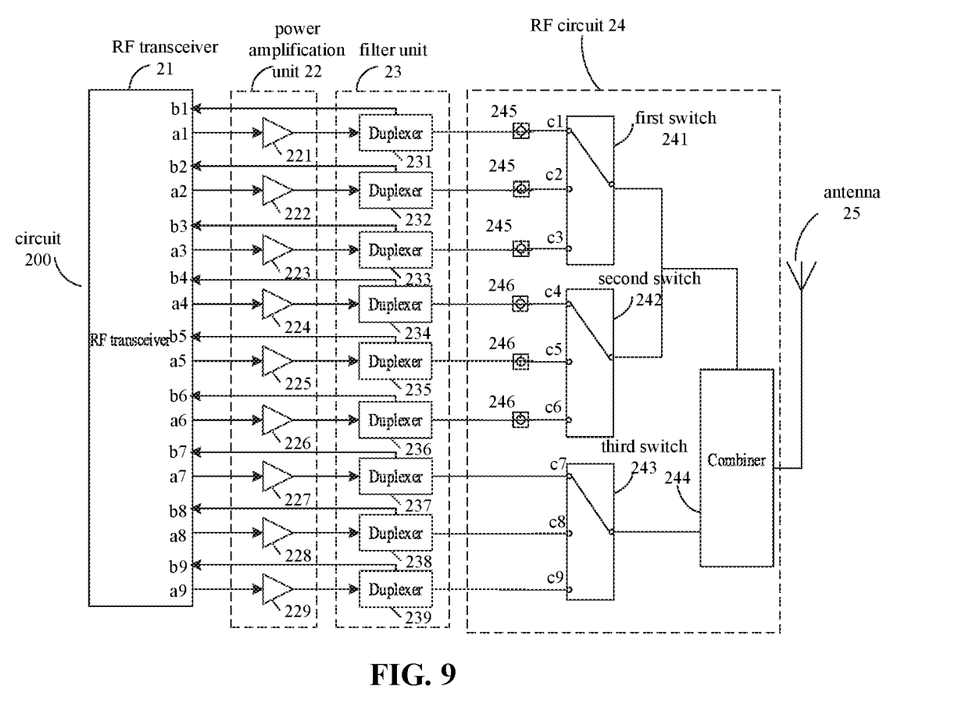
FIG. 9 is a fourth structure diagram of RF circuit according to an embodiment of the disclosure.

As illustrated in FIG. 9, FIG. 9 is a structure diagram of an overall circuit 200. The RF transceiver 21 includes nine RF transmitting ports a1, a2, a3, a4, a5, a6, a7, a8 and a9 and nine RF receiving ports b1, b2, b3, b4, b5, b6, b7, b8 and b9.

Here, a1, a2 and a3 are high-frequency transmitting ports configured to transmit high-frequency RF signals (for example, RF signals in bands such as band7, band40 and band41), and b1, b2 and b3 are high-frequency receiving ports configured to receive high-frequency RF signals. Here, a4, a5 and a6 are medium-frequency transmitting ports configured to transmit medium-frequency RF signals (for example, RF signals in bands such as band1, band2 and band3), and b4, b5 and b6 are medium-frequency receiving ports configured to receive medium-frequency RF signals. Here, a7, a8 and a9 are low-frequency transmitting ports configured to transmit low-frequency RF signals (for example, RF signals in bands such as band8, band12 and band20), and b7, b8 and b9 are low-frequency receiving ports configured to receive low-frequency RF signals.

The abovementioned embodiments are only described with an example in which the high-frequency port, medium-frequency port and low-frequency port of the RF transceiver 21 each include three RF transmitting ports and three RF receiving ports. In some other embodiments, the high-frequency port, the medium-frequency port and the low-frequency port of the RF transceiver 21 each may include another numbers of RF transmitting ports and RF receiving ports, and the number of the RF transmitting ports in each of the high-frequency port 21H, the medium-frequency port 21M and the low-frequency port 21L is the same and greater than 1 and the number of the RF receiving ports in each of the high-frequency port 21H, the medium-frequency port 21M and the low-frequency port 21L is the same and greater than 1.

The power amplification unit 22 includes nine amplifiers 221, 222, 223, 224, 225, 226, 227, 228 and 229. Each of the amplifiers 221, 222, 223, 224, 225, 226, 227, 228 and 229 is connected with a respective one of the RF transmitting ports a1, a2, a3, a4, a5, a6, a7, a8 and a9 of the RF transceiver 21.

The power amplification unit 22 is configured to amplify an uplink signal transmitted by the RF transceiver 21 and send an amplified uplink signal to the filter unit 23.

An RF circuit switch 24 includes the first switch 241, the second switch 242, the third switch 243, the first phase shifter module 245, the second phase shifter module 246 and the combiner 244.

Each of the first switch 241, the second switch 242 and the third switch 243 is a single-pole multi-throw switch. For example, the first switch 241 includes three input sub-ports c1, c2 and c3, the second switch 242 includes three input sub-ports c4, c5 and c6, and the third switch 243 includes three input sub-ports c7, c8 and c9. The first switch 241 and the second switch 242, which are connected with each other, are connected to an input terminal of the combiner 244, and the output terminal of the third switch 243 is connected to an input terminal of the combiner 244.

The combiner 244 may be a dual-frequency combiner. The output terminal of the combiner 244 is connected to the antenna 25.

In the embodiment of the disclosure, the RF circuit switch 24 may control the high-frequency RF signal and the medium-frequency RF signal to implement carrier aggregation to obtain the first aggregation signal, and the combiner 244 may further perform carrier aggregation of the first aggregation signal and the low-frequency RF signal, so that a diversity of carrier aggregation of RF signals by the electronic device 100 may be improved.

The disclosure also provides an electronic device, which includes a housing and a circuit board. The circuit board is mounted in the housing. An RF circuit is disposed on the circuit board. The RF circuit includes an RF transceiver, a first switch, a second switch, a third switch, a first phase shifter module, a second phase shifter module, a combiner and an antenna. The RF transceiver is connected with an input terminal of each of the first switch, the second switch and the third switch, and the antenna is connected with an output terminal of the combiner.

The input terminal of the first switch includes a high-frequency port, the high-frequency port is configured to transmit and receive high-frequency RF signals, and the first phase shifter module is connected with the input terminal of the first switch.

The input terminal of the second switch includes a medium-frequency port, the medium-frequency port is configured to transmit and receive medium-frequency RF signals, and the second phase shifter module is connected with the input terminal of the second switch.

The input terminal of the third switch includes a low-frequency port, and the low-frequency port is configured to transmit and receive low-frequency RF signals.

The first switch, the second switch, the third switch, the first phase shifter module and the second phase shifter module are encapsulated into a switch chip, and an output terminal of the first switch and an output terminal of the second switch are connected with each other outside the switch chip.

When the first switch connects the first phase shifter module with the combiner and the second switch connects the second phase shifter module with the combiner, the first phase shifter module adjusts a phase shift amount of a high-frequency RF signal output by the high-frequency port to a first preset value and the second phase shifter module adjusts a phase shift amount of a medium-frequency RF signal output by the medium-frequency port to a second preset value, to allow a transmission path for the high-frequency RF signal to be cut off relative to the medium-frequency RF signal and allow a transmission path for the medium-frequency RF signal to be cut off relative to the high-frequency RF signal, so as to perform carrier aggregation of the high-frequency RF signal and the medium-frequency RF signal to obtain a first aggregation signal, and the combiner performs carrier aggregation of the first aggregation signal and a low-frequency RF signal.

In an embodiment, the RF transceiver includes a high-frequency port, a medium-frequency port and a low-frequency port, the high-frequency port is connected with the input terminal of the first switch, the medium-frequency port is connected with the input terminal of the second switch, and the low-frequency port is connected with the input terminal of the third switch.

In an embodiment, the high-frequency port includes $N_1$ transmitting sub-ports with different bands and $N_1$ receiving sub-ports with different bands, the input terminal of the first switch includes $N_1$ input sub-ports, each of the $N_1$ transmitting sub-ports is connected with a respective one of the $N_1$ input sub-ports, and each of the $N_1$ receiving sub-ports is connected with a respective one of the $N_1$ input sub-ports.

The medium-frequency port includes $N_2$ transmitting sub-ports with different bands and $N_2$ receiving sub-ports with different bands, the input terminal of the second switch includes $N_2$ input sub-ports, each of the $N_2$ transmitting sub-ports is connected with a respective one of the $N_2$ input sub-ports, and each of the $N_2$ receiving sub-ports is connected with a respective one of the $N_2$ input sub-ports.

The low-frequency port includes $N_3$ transmitting sub-ports with different bands and $N_3$ receiving sub-ports with different bands, the input terminal of the third switch includes $N_3$ input sub-ports, each of the $N_3$ transmitting sub-ports is connected with a respective one of the $N_3$ input sub-ports, and each of the $N_3$ receiving sub-ports is connected with a respective one of the $N_3$ input sub-ports.

The $N_1$, $N_2$ and $N_3$ are each a natural number greater than 1.

In an embodiment, a duplexer or a filter is connected between each of the sub-ports and a respective one of the input sub-ports.

In an embodiment, a power amplifier is connected between each of the sub-ports and a respective one of the input sub-ports.

In an embodiment, an output terminal of the combiner is connected with the antenna.

In an embodiment, the antenna includes a first antenna and a second antenna, the output terminal of the first switch and the output terminal of the second switch, which are connected with each other, are connected with the first antenna, and an output terminal of the third switch is connected with the second antenna.

Figure 10:
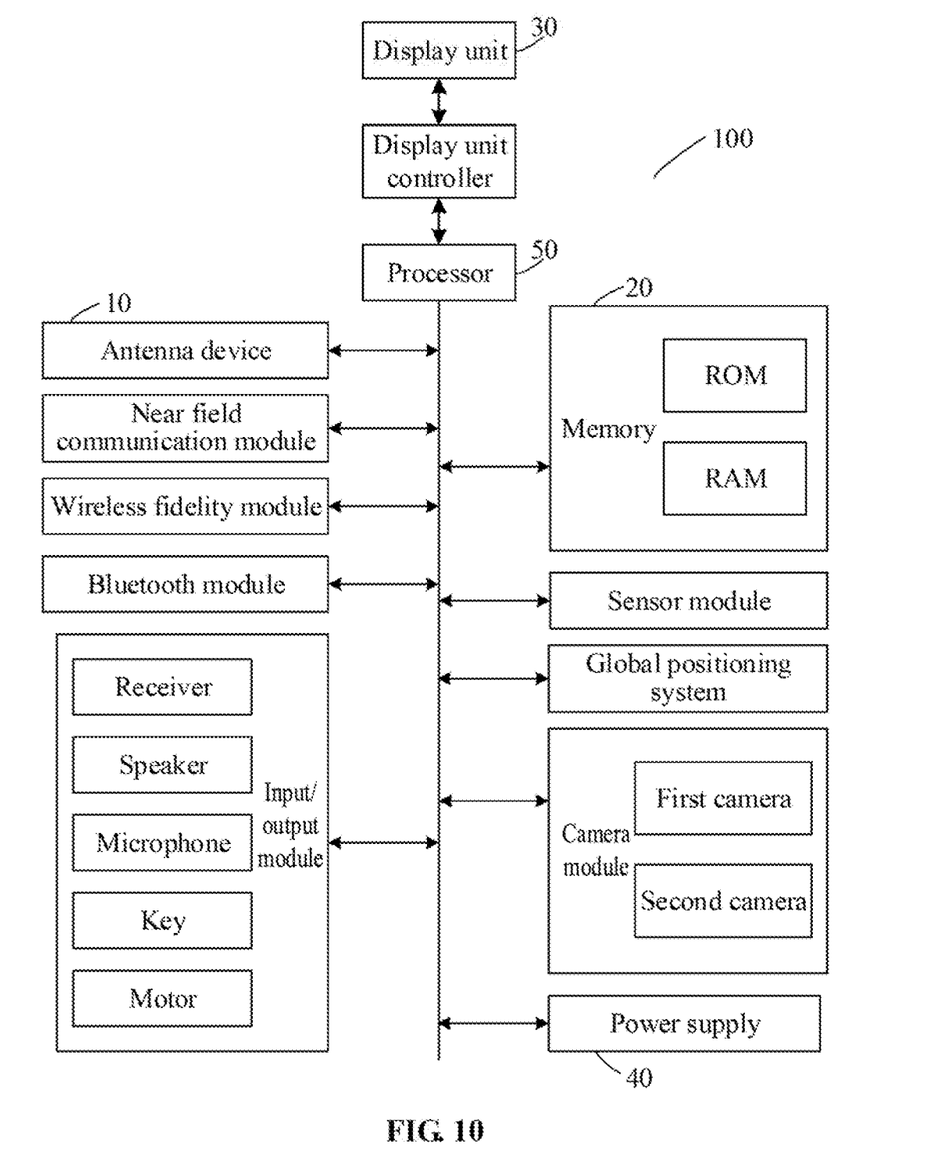
FIG. 10 is another structure diagram of an electronic device according to an embodiment of the disclosure.

Referring to FIG. 10, FIG. 10 is another structure diagram of an electronic device 100 according to an embodiment of the disclosure. The electronic device 100 includes an antenna device 10, a memory 20, a display unit 30, a power supply 40 and a processor 50. Those skilled in the art should understand that the structure of the electronic device 100 illustrated in FIG. 10 is not intended to limit the electronic device 100. The electronic device 100 may include components more or fewer than those illustrated in the figure, or some components are combined or different component arrangements are adopted.

The antenna device 10 includes the overall circuit 200 described in any abovementioned embodiment. The antenna device 10 may communicate with a network device (for example, a server) or another electronic device (for example, a smart phone) through a wireless network to complete information transmission and reception with the network device or the another electronic device.

The memory 20 may be configured to store an application program and data. The application program stored in the memory 20 includes an executable program code. The application program may form various functional modules. The processor 50 runs the application program stored in the memory 20, thereby executing various functional applications and data processing.

The display unit 30 may be configured to display information that input by a user into the electronic device 100 and that is provided for the user, and display various graphical user interfaces of the electronic device 100. These graphical user interfaces may be formed by graphics, texts, icons, videos and any combination thereof. The display unit 30 may include a display panel.

The power supply 40 is configured to supply power to each component of the electronic device 100. In some embodiments, the power supply 40 may be logically connected with the processor 50 through a power management system, thereby realizing functions of charging and discharging management, power consumption management and the like through the power management system.

The processor 50 is a control center of the electronic device 100. The processor 50 connects each part of the whole electronic device 100 by use of various interfaces and lines and executes various functions and data processing of the electronic device 100 by running or executing the application program stored in the memory 20 and calling the data stored in the memory 20, thereby monitoring the whole electronic device 100.

In addition, the electronic device 100 may further include a camera module, a Bluetooth module and the like, and elaborations are omitted herein.

During specific implementation, each of the modules may be implemented as an independent entity, or may be freely combined for implementation as the same or a plurality of entities. Specific implementation of each of the modules may refer to the abovementioned method embodiments and will not be elaborated here.

Those of ordinary skill in the art should know that all or part of the operations in each method of the embodiments may be completed by related hardware instructed through a program, the program may be stored in a computer-readable storage medium, for example, stored in the memory of the electronic device, and is executed by at least one processor in the electronic device, and an execution process may include, for example, a flow of the embodiment of an information publishing method. The storage medium may include a Read Only Memory (ROM), a Random Access Memory (RAM), a magnetic disk or an optical disk, etc.

The RF circuit and electronic device provided in the embodiments of the disclosure are introduced above in detail, each function module thereof may be integrated into a processing chip, each module may also physically exist independently, and two or more than two modules may also be integrated into a module. The integrated module may be implemented in a hardware form and may also be implemented in form of software functional module. The principle and implementation modes of the disclosure are elaborated with specific examples in the disclosure, and the descriptions made to the embodiments are only adopted to understand the methods of the disclosure and the core concept thereof. In addition, those skilled in the art may make variations to the specific implementation modes and the application scope according to the concept of the disclosure. From the above, the contents of the specification should not be understood as limits to the disclosure.

The invention claimed is:

1. A Radio Frequency (RF) circuit, comprising: a first switch, a second switch, a third switch, a first phase shifter circuit, a second phase shifter circuit and a combiner, wherein an input terminal of the first switch comprises a high-frequency port, the high-frequency port is configured to transmit and receive high-frequency RF signals, and the first phase shifter circuit is configured to be connected with the input terminal of the first switch;

an input terminal of the second switch comprises a medium-frequency port, the medium-frequency port is configured to transmit and receive medium-frequency RF signals, and the second phase shifter circuit is configured to be connected with the input terminal of the second switch;

an input terminal of the third switch comprises a low-frequency port, and the low-frequency port is configured to transmit and receive low-frequency RF signals;

the first switch, the second switch, the third switch, the first phase shifter circuit and the second phase shifter circuit are encapsulated into a switch chip, and an output terminal of the first switch and an output terminal of the second switch are connected with each other outside the switch chip; and wherein when the first switch is configured to connect the first phase shifter circuit with the combiner and the second switch is configured to connect the second phase shifter circuit with the combiner, the first phase shifter circuit is configured to adjust a phase shift amount of a high-frequency RF signal output by the high-frequency port to a first preset value and the second phase shifter circuit is configured to adjust a phase shift amount of a medium-frequency RF signal output by the medium-frequency port to a second preset value; to allow a transmission path for the high-frequency RF signal to be cut off relative to the medium-frequency RF signal and allow a transmission path for the medium-frequency RF signal to be cut off relative to the high-frequency RF signal, so as to perform Carrier Aggregation (CA) of the high-frequency RF signal and the medium-frequency RF signal to obtain a first aggregation signal, and the combiner is configured to perform CA of the first aggregation signal and a low-frequency RF signal.

2. The RF circuit of claim 1, wherein when the first switch is configured to connect the first phase shifter circuit with the combiner and the second switch is configured to disconnect the second phase shifter circuit from the combiner, the combiner is configured to perform CA of the high-frequency RF signal and the low-frequency RF signal;

when the first switch is configured to disconnect the first phase shifter circuit from the combiner and the second switch is configured to connect the second phase shifter circuit with the combiner, the combiner is configured to perform CA of the medium-frequency RF signal and the low-frequency RF signal.

3. The RF circuit of claim 1, wherein the output terminal of the first switch and the output terminal of the second switch, which are connected with each other outside the switch chip, are connected with an input terminal of the combiner, and an output terminal of the third switch is connected with an input terminal of the combiner.

4. The RF circuit of claim 1, wherein the combiner is a dual-frequency combiner.

5. The RF circuit of claim 1, wherein the first switch, the second switch and the third switch each is a single-pole multi-throw switch.

6. A Radio Frequency (RF) circuit, comprising, an RF transceiver, a first switch, a second switch, a third switch, a first phase shifter circuit, a second phase shifter circuit, a combiner and an antenna, wherein the RF transceiver is configured to be connected with an input terminal of each of the first switch, the second switch and the third switch, and the antenna is connected with an output terminal of the combiner;

the input terminal of the first switch comprises a high-frequency port, the high-frequency port is configured to transmit and receive high-frequency RF signals, and the first phase shifter circuit is configured to be connected with the input terminal of the first switch;

the input terminal of the second switch comprises a medium-frequency port, the medium-frequency port is configured to transmit and receive medium-frequency RF signals, and the second phase shifter circuit is configured to be connected with the input terminal of the second switch;

the input terminal of the third switch comprises a low-frequency port, and the low-frequency port is configured to transmit and receive low-frequency RF signals;

the first switch, the second switch, the third switch, the first phase shifter circuit and the second phase shifter circuit are encapsulated into a switch chip, and an output terminal of the first switch and an output terminal of the second switch are connected with each other outside the switch chip; and wherein when the first switch is configured to connect the first phase shifter circuit with the combiner and the second switch is configured to connect the second phase shifter circuit with the combiner, the first phase shifter circuit is configured to adjust a phase shift amount of a high-frequency RF signal output by the high-frequency port to a first preset value and the second phase shifter circuit is configured to adjust a phase shift amount of a medium-frequency RF signal output by the medium-frequency port to a second preset value; to allow a transmission path for the high-frequency RF signal to be cut off relative to the medium-frequency RF signal and allow a transmission path for the medium-frequency RF signal to be cut off relative to the high-frequency RF signal, so as to perform Carrier Aggregation (CA) of the high-frequency RF signal and the medium-frequency RF signal to obtain a first aggregation signal, and the combiner is configured to perform CA of the first aggregation signal and a low-frequency RF signal.

7. The RF circuit of claim 6, wherein the RF transceiver comprises a high-frequency port, a medium-frequency port and a low-frequency port, the high-frequency port is connected with the input terminal of the first switch, the medium-frequency port is connected with the input terminal of the second switch, and the low-frequency port is connected with the input terminal of the third switch.

8. The RF circuit of claim 7, wherein
the high-frequency port comprises $N_1$ transmitting sub-ports with different bands and $N_1$ receiving sub-ports with different bands, the input terminal of the first switch comprises $N_1$ input sub-ports, each of the $N_1$ transmitting sub-ports is connected with a respective one of the $N_1$ input sub-ports, and each of the $N_1$ receiving sub-ports is connected with a respective one of the $N_1$ input sub-ports;
the medium-frequency port comprises $N_2$ transmitting sub-ports with different bands and $N_2$ receiving sub-ports with different bands, the input terminal of the second switch comprises $N_2$ input sub-ports, each of the $N_2$ transmitting sub-ports is connected with a respective one of the $N_2$ input sub-ports, and each of the $N_2$ receiving sub-ports is connected with a respective one of the $N_2$ input sub-ports; and
the low-frequency port comprises $N_3$ transmitting sub-ports with different bands and $N_3$ receiving sub-ports with different bands, the input terminal of the third switch comprises $N_3$ input sub-ports, each of the $N_3$ transmitting sub-ports is connected with a respective one of the $N_3$ input sub-ports, and each of the $N_3$ receiving sub-ports is connected with a respective one of the $N_3$ input sub-ports,
wherein $N_1$, $N_2$ and $N_3$ are each a natural number greater than 1.

9. The RF circuit of claim 8, wherein a duplexer or a filter is connected between each of the transmitting sub-ports and the receiving sub-ports and a respective one of the input sub-ports.

10. The RF circuit of claim 8, wherein a power amplifier is connected between each of the transmitting sub-ports and a respective one of the input sub-ports.

11. The RF circuit of claim 6, wherein the antenna comprises a first antenna and a second antenna, the output terminal of the first switch and the output terminal of the second antenna, which are connected with each other, are connected with the first antenna, and an output terminal of the third switch is connected with the second antenna.

12. The RF circuit of claim 6, wherein the antenna comprises the first antenna, the second antenna and a third antenna, the output terminal of the first switch is connected with the first antenna, the output terminal of the second switch is connected with the second antenna, and an output terminal of the third switch is connected with the third antenna.

13. An electronic device, comprising, a housing and a circuit board, wherein the circuit board is mounted in the housing, a Radio Frequency (RF) circuit is disposed on the circuit board, the RF circuit comprises an RF transceiver, a first switch, a second switch, a third switch, a first phase shifter circuit, a second phase shifter circuit, a combiner and an antenna, the RF transceiver is configured to be connected with an input terminal of each of the first switch, the second switch and the third switch, and the antenna is connected with an output terminal of the combiner;
the input terminal of the first switch comprises a high-frequency port, the high-frequency port is configured to transmit and receive high-frequency RF signals, and the first phase shifter circuit is configured to be connected with the input terminal of the first switch;
the input terminal of the second switch comprises a medium-frequency port, the medium-frequency port is configured to transmit and receive medium-frequency RF signals, and the second phase shifter circuit is configured to be connected with the input terminal of the second switch;
the input terminal of the third switch comprises a low-frequency port, and the low-frequency port is configured to transmit and receive low-frequency RF signals;
the first switch, the second switch, the third switch, the first phase shifter circuit and the second phase shifter circuit are encapsulated into a switch chip, and an output terminal of the first switch and an output terminal of the second switch are connected with each other outside the switch chip; and
wherein when the first switch is configured to connect the first phase shifter circuit with the combiner and the second switch is configured to connect the second phase shifter circuit with the combiner, the first phase shifter circuit is configured to adjust a phase shift amount of a high-frequency RF signal output by the high-frequency port to a first preset value and the second phase shifter circuit is configured to adjust a phase shift amount of a medium-frequency RF signal output by the medium-frequency port to a second preset value to allow a transmission path for the high-frequency RF signal to be cut off relative to the medium-frequency RF signal and allow a transmission path for the medium-frequency RF signal to be cut off relative to the high-frequency RF signal, so as to perform Carrier Aggregation (CA) of the high-frequency RF signal and the medium-frequency RF signal to obtain a first aggregation signal, and the combiner is configured to perform CA of the first aggregation signal and a low-frequency RF signal.

14. The electronic device of claim 13, wherein the RF transceiver comprises a high-frequency port, a medium-frequency port and a low-frequency port, the high-frequency port is connected with the input terminal of the first switch, the medium-frequency port is connected with the input terminal of the second switch, and the low-frequency port is connected with the input terminal of the third switch.

15. The electronic device of claim 14, wherein
the high-frequency port comprises $N_1$ transmitting sub-ports with different bands and $N_1$ receiving sub-ports with different bands, the input terminal of the first switch comprises $N_1$ input sub-ports, each of the $N_1$ transmitting sub-ports is connected with a respective one of the $N_1$ input sub-ports, and each of the $N_1$ receiving sub-ports is connected with a respective one of the $N_1$ input sub-ports;
the medium-frequency port comprises $N_2$ transmitting sub-ports with different bands and $N_2$ receiving sub-ports with different bands, the input terminal of the second switch comprises $N_2$ input sub-ports, each of the $N_2$ transmitting sub-ports is connected with a respective one of the $N_2$ input sub-ports, and each of the $N_2$ receiving sub-ports is connected with a respective one of the $N_2$ input sub-ports; and
the low-frequency port comprises $N_3$ transmitting sub-ports with different bands and $N_3$ receiving sub-ports with different bands, the input terminal of the third switch comprises $N_3$ input sub-ports, each of the $N_3$ transmitting sub-ports is connected with a respective one of the $N_3$ input sub-ports, and each of the $N_3$ receiving sub-ports is connected with a respective one of the $N_3$ input sub-ports, wherein $N_1$, $N_2$ and $N_3$ are each a natural number greater than 1.

16. The electronic device of claim 15, wherein a duplexer or a filter is connected between each of the transmitting sub-ports and the receiving sub-ports and a respective one of the input sub-ports.

17. The electronic device of claim 13, wherein a power amplifier is connected between each of the transmitting sub-ports and a respective one of the input sub-ports.

18. The electronic device of claim 13, wherein the antenna comprises a first antenna and a second antenna, the output terminal of the first switch and the output terminal of the second antenna, which are connected with each other, are connected with the first antenna, and an output terminal of the third switch is connected with the second antenna.

19. The RF circuit of claim 6, wherein the first switch, the second switch and the third switch each is a single-pole multi-throw switch.

20. The electronic device of claim 13, wherein the first switch, the second switch and the third switch each is a single-pole multi-throw switch.

\* \* \* \* \*

UNITED STATES PATENT AND TRADEMARK OFFICE
CERTIFICATE OF CORRECTION

PATENT NO. : 10,924,139 B2  
APPLICATION NO. : 16/633072  
DATED : February 16, 2021  
INVENTOR(S) : Ming Cong et al.

Page 1 of 1

It is certified that error appears in the above-identified patent and that said Letters Patent is hereby corrected as shown below:

On the Title Page

Item (71) Applicant:  
"Guangdong (CN)"  
Should read:  
--Dongguan, Guangdong (CN)--

Item (72) Inventors:  
"Guangdong (CN)"  
Should read:  
--Dongguan, Guangdong (CN)--

Item (73) Assignee:  
"Guangdong (CN)"  
Should read:  
--Dongguan, Guangdong (CN)--

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*